United States Patent [19]
Körtge

[11] Patent Number: 5,460,198
[45] Date of Patent: Oct. 24, 1995

[54] PRESSURE-ACTIVATED FLOW-CONTROL VALVE

[75] Inventor: Randolf Körtge, Usingen, Germany

[73] Assignee: Luk Fahrzeug-Hydraulik GmbH & Co. KG, Bad Homburg, Germany

[21] Appl. No.: 250,807

[22] Filed: May 27, 1994

[30] Foreign Application Priority Data

May 28, 1993 [DE] Germany ............... 43 17 786.7

[51] Int. Cl.⁶ .................................................. F16K 17/10
[52] U.S. Cl. ................. 137/116.3; 137/490; 137/491
[58] Field of Search ................... 137/115, 116, 137/116.3, 490, 491

[56] References Cited

U.S. PATENT DOCUMENTS

| | | | |
|---|---|---|---|
| 2,420,394 | 5/1947 | Gilman | 137/115 |
| 2,496,577 | 2/1950 | Cahill | 137/115 |
| 2,989,066 | 6/1961 | Norlin | 137/115 |
| 3,587,619 | 6/1971 | Krechel | 137/116 |
| 3,752,174 | 8/1973 | Turolla | 137/491 |
| 3,757,811 | 9/1973 | Broker | 137/116 |
| 4,171,004 | 10/1979 | Cerrato et al. | 137/116 |

Primary Examiner—Stephen M. Hepperle
Attorney, Agent, or Firm—Herbert Dubno; Andrew Wilford

[57] ABSTRACT

A valve assembly used in combination with a pressurized-fluid source having a high-pressure side and a low-pressure side and a load has a pressure-actuated flow regulating valve having a housing and a valve body movable in the housing and defining therein a pump compartment connectable to the high-pressure side of the source and a load compartment connectable to the load. The body is movable between a front position permitting free flow from the pump to the load compartment and a rear position limiting such flow. The valve body is formed with a throughgoing bypass passage having one end open into the load compartment and an opposite end. A spring braced between the valve body and the housing urges the valve body forwardly along an axis toward the load compartment. A relief valve in the housing connected to the opposite bypass passage end and to the low-pressure side of the source relieves pressure in the load compartment when pressure in the load compartment exceeds a predetermined limit.

12 Claims, 2 Drawing Sheets

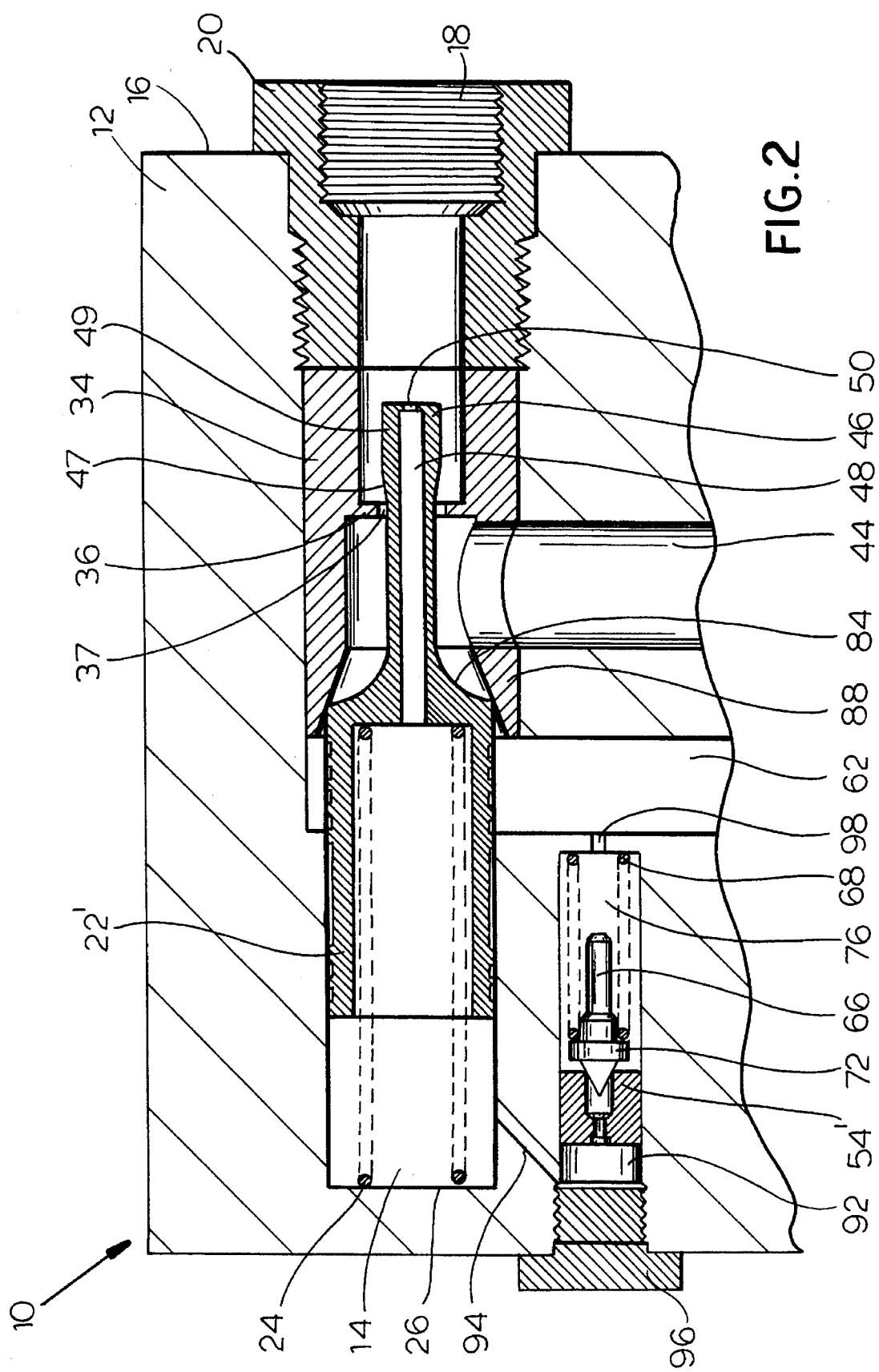

PRESSURE-ACTIVATED FLOW-CONTROL VALVE

FIELD OF THE INVENTION

The present invention relates to a valve. More particularly this invention concerns a pressure-actuated flow-control valve.

BACKGROUND OF THE INVENTION

A standard pressure-actuated flow-control valve used in combination with a pressurized-fluid source having a high-pressure side and a low-pressure side and a load has a pressure-actuated flow regulating valve having a housing, a valve body movable in the housing and defining therein a pump compartment connectable to the high-pressure side of the source and a load compartment connectable to the load, and a spring braced between the valve body and the housing and urging the valve body along an axis toward the load compartment. The body is movable between a front position permitting free flow from the pump to the load compartment and a rear position limiting such flow. This housing is formed with a throughgoing bypass passage having one end open into the load compartment and an opposite end. A relief valve is connected to the opposite bypass passage end and to the low-pressure side of the source for relieving pressure in the load compartment when pressure in the load compartment exceeds a predetermined limit.

Thus with this type of valve as pressure increases the flow to the load compartment is restricted and flow in the pump compartment is in fact relieved by draining it back to the source. When pressure in the load compartment exceeds a predetermined limit anyhow, the relief valve operates to reduce it.

The bypass passage is typically formed in the housing by drilling or casting. Drilling is difficult and requires that the access holes be carefully plugged. Casting is technically demanding and results in frequent bad castings that cannot be used.

OBJECTS OF THE INVENTION

It is therefore an object of the present invention to provide an improved pressure-actuated flow-control valve assembly.

Another object is the provision of such an improved pressure-actuated flow-control valve assembly which overcomes the above-given disadvantages, that is which is simple in construction.

SUMMARY OF THE INVENTION

A valve assembly used in combination with a pressurized-fluid source having a high-pressure side and a low-pressure side and a load has according to the invention a pressure-actuated flow regulating valve having a housing and a valve body movable in the housing and defining therein a pump compartment connectable to the high-pressure side of the source and a load compartment connectable to the load. The body is movable between a front position permitting free flow from the pump to the load compartment and a rear position limiting such flow. The valve body in accordance with the invention is formed with a throughgoing bypass passage having one end open into the load compartment and an opposite end. A spring braced between the valve body and the housing urges the valve body forwardly along an axis toward the load compartment. A relief valve in the housing connected to the opposite bypass passage end and to the low-pressure side of the source relieves pressure in the load compartment when pressure in the load compartment exceeds a predetermined limit.

Thus with this system the critical bypass passage is formed in the valve body which is produced by machining and is easily formed with an accurately dimensioned passage. The housing does not have to have the passage so it can be produced relatively cheaply, cast from aluminum.

According to the invention the valve body is centered on and displaceable along the axis and the bypass passage extends along the axis through the valve body. In addition the housing forms a port between the pump and load compartments and the valve body is formed with an extension extending through the port and having a front end always in the load compartment. The one passage end is at the front extension end. The extension has an enlarged outer end that in the rear position restricts flow through the port substantially more than in the front position. The projection tapers from the enlarged outer end toward the pump chamber.

According to another feature of the invention the relief valve is mounted in the valve body.

The housing and valve in accordance with a further feature of the invention form a rear compartment. The other end of the passage opening at least indirectly into the rear compartment so that the pressure in the rear and load compartments is the same. The relief valve is connected between the rear compartment and the low-pressure side of the source. The bypass passage opens directly into the rear compartment and the relief valve is provided in the housing offset from the valve body.

The bypass passage according to the invention is provided at its one end with a flow restriction. This restriction can also be between the ends of the bypass passage. Either way the restriction ensures rapid closing of the relief valve if the load-compartment pressure drops below the threshold level at which the valve opens.

BRIEF DESCRIPTION OF THE DRAWING

The above and other objects, features, and advantages will become more readily apparent from the following description, reference being made to the accompanying drawing in which:

FIG. 2 is a view like FIG. 1 of another valve in accordance with this invention.

SPECIFIC DESCRIPTION

Figure 1:
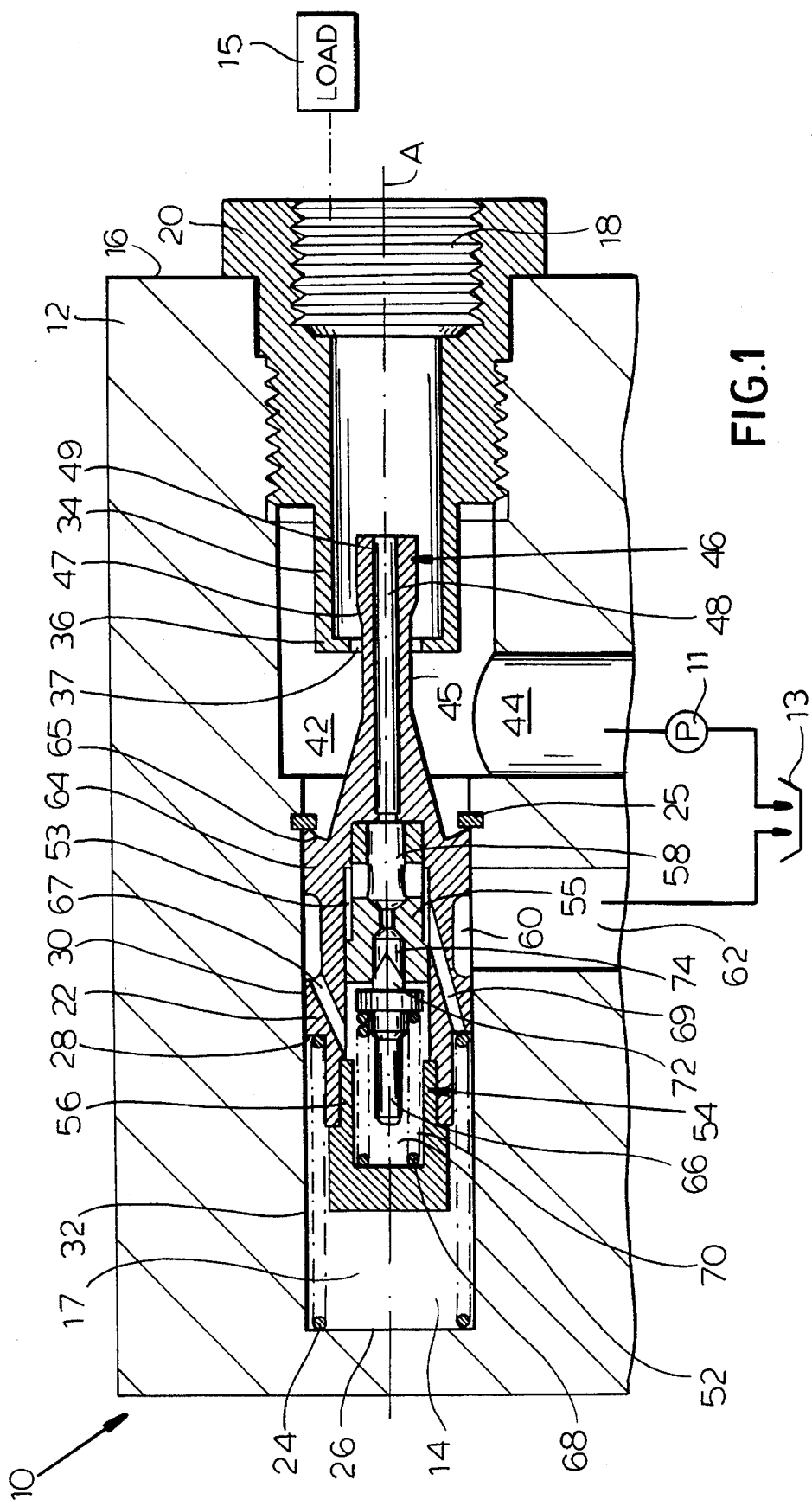
FIG. 1 is a partly diagrammatic axial section through the valve according to the invention.

As seen in FIG. 1 a valve assembly 10 according to the invention has a housing 12 formed with a stepped bore 14 centered on an axis A. The bore 14 opens forwardly at a face 16 of the housing 12 and is there closed by a plug 20 forming an outlet opening 18 connected to a fluid-operated load 15, for instance a power-steering booster. A piston-like valve body 22 in the bore 14 subdivides it into a rear compartment 17 and a front compartment 42, the latter connected via a passage 44 to the high-pressure side of a pump 11 that draws liquid from a sump 13. A spring 24 braced between a floor 26 of the bore 14 and a shoulder 28 of the body 22 biases the body 22 axially forward with a force that determines the threshold actuation pressure of the valve 10. A cylindrical outer surface 30 of the body 22 rides on a cylindrical inner surface 32 of the bore 14. The body 22 further is formed with a radially outwardly open groove forming a compartment 60 that can communicate with a passage 62 that is connected to the sump 13 and therethrough to the low-pressure side of the pump 11. To the right of the compartment 60 the body 22 has an annular body portion that is axially shorter than the passage 60. A right-hand face 65 of the body 22 can engage a snap ring 25 set in the surface 32.

The plug 20 has a tubular extension 34 having an end wall 36 formed centered on the axis A with a cylindrical hole or port 37 through which projects an axial extension stem 46 of the valve body 22. This stem 46 has a cylindrical outer end 49 of a diameter slightly smaller than the inner diameter of the port 37 and inward therefrom a frustoconical surface 47 that joins this end 49 to a small-diameter region 45. Thus as the body 22 moves backward, that is to the left in the drawing, the end 49 will greatly restrict flow through the port 37.

In addition the body 22 is formed with a chamber 52, 53 subdivided by a partition plug 55 into a rear compartment 52 and a front compartment 55. A valve 54 enclosed in the chamber 52, 53 by an end cap 56 has a valve body 66 formed with a stem 72 that can fit snugly into an axially centered hole 74 of the partition plug 55. This plug 66 is formed with a passage 58 that is a rearward axial extension of an axially centered bore or bypass passage 48 opening forwardly at the front end of the extension 46. A restriction 50 is formed between the passages 48 and 58 and the passage 58 opens into the compartment 53 which in turn is connected by passages 69 to the compartment 17 for pressure equalization to both sides of the body 22. The compartment 52 is connected by passages 67 formed in the body 22 to the compartment 60. A spring 70 braced against a floor 68 of the compartment 52 urges the valve body 66 forward, into a position with its stem 72 blocking the passage 74.

The valve described above functions as follows:

Under normal circumstances the pump 11 pressurizes the compartment 42 and the fluid therein flows through the port 37 around the stem 46 and travels to the load 15. The valve body 22 may move during normal operation a little back, but not enough for the edge of the rim 64 to uncover the passage 62.

When for instance a vehicle incorporating the system is traveling at high speed, the pump 11 puts out more fluid than the load 15 can use, so the body 22 will move back and uncover the passage 62. This will form a direct connection between the high- and low-pressure sides of the pump 13 and will effectively limit pressure. At the same time the retraction of the body 22 will cause the large-diameter end 49 of the stem 46 to move into the port 37, greatly limiting flow therethrough.

If pressure remains high it will be effective from the passage 18 through the bypass passage 48 and past the restriction 50 on the front face of the valve body 66, and will move this body 66 back out of the passage 74. This will permit flow from the passage 18 and compartment 58 into the compartment 52 and via the passages 67 to the passage 62 and sump 13, thereby also relieving pressure downstream of the port 37.

Thus pressure buildup automatically causes a restriction of flow to the load 15 coupled with a reduction in supply pressure, and subsequently a relieving of pressure at the load 15. This two-stage operation prevents the load 15 from being overly pressurized.

As pressure again drops, the valve 54 will first close, then the body 22 will move forward to close off the drain passage 62 and reopen the port 37. The restriction 50 ensures that the compartment 52 will drain rapidly and the valve 54 will respond and close rapidly.

The system of FIG. 2 operates identically to that of FIG. 1 and reference characters from FIG. 1 are used in FIG. 2 for functionally identical structure. Here however the valve 54' is provided outside the bore 14, in a bore 92 closed by a plug 96 and having end compartments 76 and 92 connected by passages 98 and 94 to the passage 62 and bore 14, respectively.

Here the valve body 22' has an edge 84 that sits in a frustoconical valve seat 79. The restriction 50 is formed at the extreme front end of the bore 48.

We claim:

1. A valve assembly used in combination with a pressurized-fluid source having a high-pressure side and a low-pressure side and a load, the assembly comprising:
   a pressure-actuated flow regulating valve having
      a housing,
      a valve body movable in the housing and defining therein a pump compartment connectable to the high-pressure side of the source and a load compartment connectable to the load, the body movable between a front position permitting free flow from the pump to the load compartment and a rear position limiting such flow, the valve body being formed with a throughgoing bypass passage having one end open into the load compartment and an opposite end, and
      a spring braced between the valve body and the housing and urging the valve body along an axis toward the load compartment; and
   a relief valve in the housing connected to the opposite bypass passage end and to the low-pressure side of the source for relieving pressure in the load compartment when pressure in the load compartment exceeds a predetermined limit.

2. The valve assembly defined in claim 1 wherein the valve body is centered on and displaceable along the axis and the bypass passage extends along the axis through the valve body.

3. The valve assembly defined in claim 2 wherein the housing forms a port between the pump and load compartments and the valve body is formed with an extension extending through the port and having a front end always in the load compartment, the one passage end being at the front extension end.

4. The valve assembly defined in claim 3 wherein the extension has an enlarged outer end that in the rear position restricts flow through the port substantially more than in the front position.

5. The valve assembly defined in claim 4 wherein the projection tapers from the enlarged outer end toward the pump chamber.

6. The valve assembly defined in claim 3 wherein the bypass passage is provided with a flow restriction.

7. The valve assembly defined in claim 1 wherein the relief valve is mounted in the valve body.

8. The valve assembly defined in claim 1 wherein the housing and valve further form a rear compartment, the other end of the passage opening at least indirectly into the rear compartment, whereby the pressure in the rear compartment is the same as the pressure in the load compartment.

9. The valve assembly defined in claim 8 wherein the relief valve is connected between the rear compartment and the low-pressure side of the source.

10. The valve assembly defined in claim 8 wherein the bypass passage opens directly into the rear compartment and the relief valve is provided in the housing offset from the valve body.

11. The valve assembly defined in claim 1 wherein the bypass passage is provided at its one end with a flow restriction.

12. The valve assembly defined in claim 1 wherein the bypass passage is provided between its ends with a flow restriction.

* * * * *